United States Patent
Behringer et al.

(10) Patent No.: US 12,142,907 B2
(45) Date of Patent: Nov. 12, 2024

(54) OVERCURRENT PROTECTION DEVICE FOR PROTECTING A CONSUMER ARRANGED IN A DC GRID

(71) Applicant: Siemens Aktiengesellschaft, Munich (DE)

(72) Inventors: Klaus Behringer, Igensdorf (DE); Wolfgang Feil, Schwandorf (DE); Peter Kaluza, Rieden (DE); Annemarie Lehmeier, Ursensollen (DE); Matthias Meier, Poppenricht (DE); Josef Burger, Schmidgaden (DE); Thomas Bär, Fichtenhof (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 258 days.

(21) Appl. No.: 17/611,423

(22) PCT Filed: May 15, 2020

(86) PCT No.: PCT/EP2020/063571
§ 371 (c)(1),
(2) Date: Nov. 15, 2021

(87) PCT Pub. No.: WO2020/234136
PCT Pub. Date: Nov. 26, 2020

(65) Prior Publication Data
US 2022/0231497 A1 Jul. 21, 2022

(30) Foreign Application Priority Data
May 17, 2019 (EP) ..................... 19175083

(51) Int. Cl.
*H02H 3/087* (2006.01)
*H02H 1/00* (2006.01)

(52) U.S. Cl.
CPC .......... *H02H 3/087* (2013.01); *H02H 1/0007* (2013.01)

(58) Field of Classification Search
CPC .......... H02H 3/00; H02H 3/003; H02H 3/006; H02H 3/08; H02H 3/081; H02H 3/083;
(Continued)

(56) References Cited

U.S. PATENT DOCUMENTS

2009/0027814 A1 1/2009 Meid
2011/0141643 A1 6/2011 Hummel et al.
(Continued)

FOREIGN PATENT DOCUMENTS

CN 101401272 A 4/2009
CN 102124619 A 7/2011
(Continued)

OTHER PUBLICATIONS

PCT International Search Report and Written Opinion of International Searching Authority mailed Aug. 19, 2020 corresponding to PCT International Application No. PCT/EP2020/063571 filed May 15, 2020.
(Continued)

Primary Examiner — Thienvu V Tran
Assistant Examiner — Carlos O Rivera-Perez
(74) Attorney, Agent, or Firm — Harness, Dickey & Pierce, P.L.C.

(57) ABSTRACT

An overcurrent protection device is for protecting a load arranged in a DC grid. The load is coupled to a supply busbar, which is connectable to a supply potential of the DC grid, in the DC grid via the overcurrent protection device. The overcurrent protection device is designed to ascertain a current trigger value based upon a detected value of a current flowing through the overcurrent protection device and a trigger characteristic which is assigned to the load and is
(Continued)

based on the current; compare the current trigger value with a threshold, and either trigger the overcurrent protection device or not, based upon the result of the comparison. The current is taken into consideration together with a first or a second factor in the trigger characteristic based upon the current direction.

20 Claims, 3 Drawing Sheets

(58) Field of Classification Search
CPC .. H02H 3/085; H02H 3/087–105; H02H 3/16; H02H 3/18; H02H 1/00; H02H 1/0007; H02H 6/00; H02H 6/005; H02H 7/00; H02H 7/08; H02H 7/0811; H02H 7/0833; H02H 7/0844; H02H 7/085; H02H 7/0852; H02H 7/0854; H02H 7/22; H02H 7/26; H02H 7/268; H02H 5/00; H02H 5/04; H02H 5/041; H02H 5/048
USPC .... 361/62, 63, 67, 78, 79, 84, 87, 93.1–103, 361/106; 323/167, 271–277, 282–285, 323/293, 351, 907
See application file for complete search history.

(56) References Cited

U.S. PATENT DOCUMENTS

| | | |
|---|---|---|
| 2013/0162035 A1* | 6/2013 | Sullivan ............... H02H 7/28 307/18 |
| 2014/0240882 A1 | 8/2014 | Hogg |
| 2015/0107646 A1 | 4/2015 | Fife et al. |
| 2017/0098931 A1 | 4/2017 | Gerdinand et al. |

FOREIGN PATENT DOCUMENTS

| | | |
|---|---|---|
| CN | 106537712 A | 3/2017 |
| CN | 106663557 A | 5/2017 |
| DE | 102014223856 A1 | 5/2016 |
| EP | 2608340 A1 | 6/2013 |
| WO | WO 2013139335 A2 | 9/2013 |

OTHER PUBLICATIONS

Yin Chunxiao et al.: "Control Principle and Protection Analysis of the HVDC Open Line Test", p. 31-35, Dec. 20, 2012.

\* cited by examiner

OVERCURRENT PROTECTION DEVICE FOR PROTECTING A CONSUMER ARRANGED IN A DC GRID

PRIORITY STATEMENT

This application is the national phase under 35 U.S.C. § 371 of PCT International Application No. PCT/EP2020/063571 which has an International filing date of May 15, 2020, which designated the United States of America 2020 and which claims priority to European patent application No. EP19175083 filed May 17, 2019, the entire contents of each of which are hereby incorporated herein by reference.

FIELD

The present application generally relates to an overcurrent protection device for protecting a consumer arranged in a DC grid, to a DC grid and to methods for operating an overcurrent protection device and a DC grid.

BACKGROUND

Load assemblies that are supplied with power from a DC grid are used, in particular, in the industrial sphere. The supply of power to load assemblies from DC grids affords the advantage of being able to react to fluctuating grid quality and energy supplies in a flexible and robust manner by way of intelligent grid control and integrated stores. In particular, regenerative energy generators, such as battery stores and/or photovoltaics installations, for example, can easily be integrated into a DC grid. Conversion losses from AC to DC voltage can be prevented in this case. The option of being able to buffer-store braking energy, for example of drives operated by way of a generator, results in energy savings.

The distribution of the energy in a DC grid takes place as in the previously used AC grids. In tree-like DC grids, starting from the energy source or a supply rail, the current intensity and also the required cable cross-section decreases in steps from the infeed to the consumers. With each change in the line cross-section, that is to say after each branching, controllable overcurrent protection devices are usually provided, which rapidly switch off in the event of an overcurrent detected in the subsequent line branch. Overcurrents in a line branch can arise not only in the case of faults in the line branch but also in the case of greatly different consumers in different line branches, when, for example, one of the consumers passes to generator operation and temporarily feeds current into the other line branch.

SUMMARY

At least one embodiment of the invention specifies an overcurrent protection device and/or a method for operation in a DC grid that are improved in terms of function and/or structure with respect to the protective function thereof. At least one embodiment of the invention further specifies a DC grid having such an overcurrent protection device and/or a method for the operation thereof that are improved in terms of function and/or structure.

Embodiments are directed to an overcurrent protection device; a DC grid; a method for operating the overcurrent protection device; a computer program product; a method for operating the DC grid; and a computer program product. Advantageous configurations result from the claims.

According to a first embodiment of the present invention, an overcurrent protection device for protecting a consumer arranged in a DC grid is proposed. The consumer is, in particular, one or more capacitive consumers. Such capacitive consumers are inverters, for example, which generate a three-phase or at least an AC voltage for a load, for example a motor, from the voltage provided by the DC grid. In addition to a number of switching elements, such inverters generally have one or more capacitances for the operation thereof.

According to a second embodiment, a DC grid is proposed, which comprises a supply rail, which can be connected or is connected to a supply potential of the DC grid, and a load assembly comprising at least one consumer. Each of the consumers is coupled to the supply rail via an associated controllable overcurrent protection device. A current-dependent trigger characteristic curve is associated with each of the consumers. In an embodiment, the overcurrent protection device is designed according to an embodiment described herein.

According to a third embodiment of the present invention, a method for operating an overcurrent protection device for protecting a consumer arranged in a DC grid is proposed. In the DC grid, the consumer is coupled via the overcurrent protection device to a supply rail, which can be connected or is connected to a supply potential of the DC grid. In the method, a present trigger value is ascertained based upon a detection value of a current flowing through the overcurrent protection device and based upon a current-dependent trigger characteristic curve associated with the consumer, wherein the current is taken into consideration together with a first or a second factor in the trigger characteristic curve, depending on the current direction. Furthermore, in the method, the present trigger value is compared with a previously stipulated threshold value. Finally, the overcurrent protection device is triggered or not triggered depending on the result of the comparison.

According to a fourth embodiment, the invention proposes a computer program product, which can be loaded directly into the internal memory of a digital control unit of an overcurrent protection device and comprises software code sections, using which the steps of the method described herein are executed when the product is run on the control unit. The computer program product can be embodied in the form of a storage medium, such as a USB memory stick, a DVD, a CD-ROM or a memory card, for example. The computer program product can also be present in the form of a signal that can be loaded via a wireless or wired communication link.

According to a fifth embodiment of the present invention, a method for operating a DC grid is proposed, which comprises a supply rail, which can be connected or is connected to a supply potential of the DC grid, and a load assembly comprising at least one consumer, wherein each of the consumers is coupled to the supply rail via an associated controllable overcurrent protection device and wherein a current-dependent trigger characteristic curve is associated with each of the consumers. In the method, for each of the at least one consumer, the following steps are carried out independently of one another: a present trigger value is ascertained based upon a detection value of a current flowing through the overcurrent protection device associated with the consumer and based upon a current-dependent trigger characteristic curve associated with the respective consumer, wherein the current is taken into consideration together with a first or a second factor in the trigger characteristic curve, depending on the current direction. The present trigger value is compared with a threshold value previously stipulated for the respective consumer. The overcurrent protection device associated with a respective consumer is triggered or not triggered depending on the result of the comparison.

According to a sixth embodiment, the invention proposes a computer program product, which can be loaded directly into the internal memory of a digital control unit and comprises software code sections, using which the previously described steps are executed when the product is run on the control unit. The computer program product can be embodied in the form of a storage medium, such as a USB memory stick, a DVD, a CD-ROM or a memory card, for example. The computer program product can also be present in the form of a signal that can be loaded via a wireless or wired communication link.

BRIEF DESCRIPTION OF THE DRAWINGS

The invention is explained in more detail below with reference to example embodiments in the drawing. In the figures.

DETAILED DESCRIPTION OF THE EXAMPLE EMBODIMENTS

Figure 1:
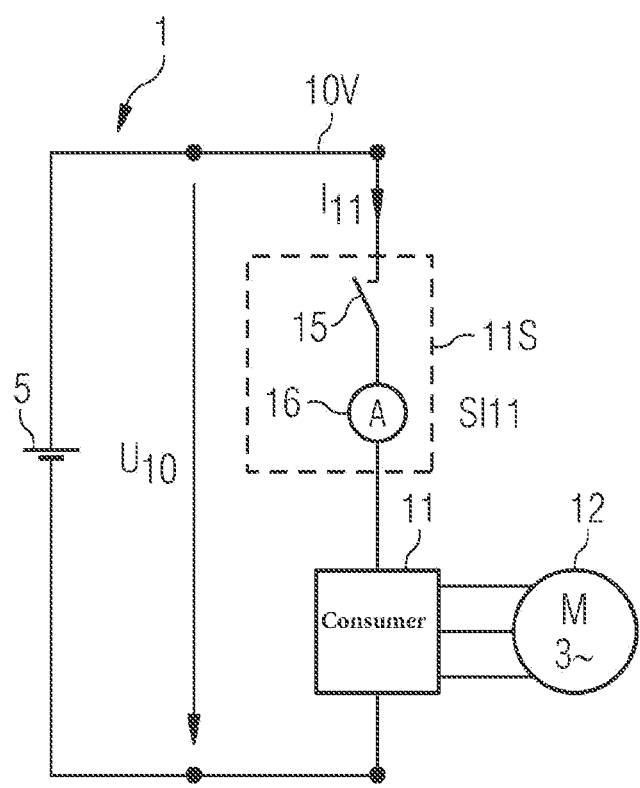
FIG. 1 shows a schematic illustration of an example overcurrent protection device for protecting a consumer arranged in a DC grid.

According to a first embodiment of the present invention, an overcurrent protection device for protecting a consumer arranged in a DC grid is proposed. The consumer is, in particular, one or more capacitive consumers. Such capacitive consumers are inverters, for example, which generate a three-phase or at least an AC voltage for a load, for example a motor, from the voltage provided by the DC grid. In addition to a number of switching elements, such inverters generally have one or more capacitances for the operation thereof.

In the DC grid of an embodiment, the consumer is coupled via the overcurrent protection device to a supply rail, which can be connected or is connected to a supply potential of the DC grid. The supply rail can therefore be connected to the supply potential directly, that is to say without further electronic components being interconnected. As an alternative, the supply rail can be connected to the supply potential via further electronic components, in particular a controllable switching element. The provision of a controllable switching element between the supply rail and the supply potential makes it possible to disconnect the supply rail from the supply potential.

The overcurrent protection device of an embodiment is a controllable overcurrent protection device, which makes it possible to disconnect the consumer from the supply rail in the event of an overcurrent arising. For this purpose, the overcurrent protection device can comprise a controllable switching element, in particular a power electronics component. In order to detect an overcurrent, the overcurrent protection device preferably has aspects that make it possible to detect a current value.

The overcurrent protection device of an embodiment is designed to ascertain a present trigger value based upon a detection value of a current flowing through the overcurrent protection device and based upon a current-dependent trigger characteristic curve associated with the consumer. The present trigger value is a computational value, which is ascertained from the detection value, which represents the current presently flowing through the overcurrent protection device, and the current-dependent trigger characteristic curve. The present trigger value therefore constitutes a measure for the thermal loading of the system in relation to the current flowing through the overcurrent protection device and thus the consumer that is to be protected.

The present trigger value of an embodiment is compared with a previously stipulated threshold value. The previously stipulated threshold value constitutes a trigger discriminant. The overcurrent protection device then triggers or does not trigger depending on the result of the comparison. If, for example, the computationally ascertained present trigger value increases as the current flowing through the overcurrent protection device increases, the overcurrent protection device triggers when the previously stipulated threshold value is exceeded, as a result of which the consumer is electrically isolated from the supply rail. As long as the present trigger value does not exceed the previously stipulated threshold value, the overcurrent protection device does not trigger. The previously stipulated threshold value can be stipulated, for example, by tests or by numerical determination. To this end, the previously stipulated threshold value can be stored permanently in a memory of the overcurrent protection device. By way of example, the previously stipulated threshold value is selected in such a way that it is a prescribed percentage value above a trigger value that is produced at the rated current.

In this case, the current is taken into consideration, that is to say processed, together with a first or with a second factor in the trigger characteristic curve, depending on the current direction. Taking the current into consideration in a manner dependent on direction makes weighting possible via the first and second factor and as a result better mapping of the thermal processes in the overcurrent protection device. This results in a higher availability at the same protection level in comparison to the previously used safety fuses.

As a result of the fact that the current is taken into consideration together with a first or a second factor in the trigger characteristic curve, depending on the current direction, a different present trigger value is produced depending on the current direction. This makes it possible, for example, to reliably take into consideration a cooling effect in the consumer brought about by the current direction. The first factor and the second factor are determined, for example, by tests or simulations. The first and the second factor are generally different.

According to an expedient configuration of an embodiment, the overcurrent protection device comprises a controllable switching element and a current measurement device interconnected in series therewith. The current measurement device detects the level of the current flowing through the controllable switching element during a switch-on phase of the controllable switching element and provides the level as detection value. According to this configuration, the overcurrent protection device itself comprises the current measurement device that determines and provides the detection value required to ascertain the present trigger value. In another configuration, the current value and the detection value can also be provided by a current measurement device outside of the overcurrent protection device. In order to be able to correctly detect the current direction flowing through the consumer, the current measurement device can comprise a sensor based on the Hall principle.

Another expedient configuration of an embodiment makes provision for the first and/or the second factor to be able to be parameterized or to be parameterized depending on the consumer that is to be protected. The first and/or the second factor can be determined for the current-dependent trigger characteristic curve associated with the consumer depending on the kind and/or the type and/or the power class of the consumer. The first and the second factor will generally have different values. In some circumstances, however, the first and second factor can also have the same value, as a result of which there is then no difference in the present trigger value, however, irrespective of the direction in which the current flows through the consumer.

Another expedient configuration of an embodiment makes provision for the first and/or second factor to be able to be parameterized or to be parameterized depending on the profile of the trigger characteristic curve. The trigger characteristic curve that is stipulated individually for the respective consumer can be selected, for example, depending on the kind and/or the type and/or the rated power. By way of example, trigger characteristic curves may be dependent on a linear or quadratic consideration of the current flowing through the consumer. While some consumers, for example, have trigger characteristic curves with a quadratic dependency on the current flowing through them, other consumers have a trigger characteristic curve that takes into consideration a linear dependency on the current.

It is furthermore expedient, in an embodiment, when the previously stipulated threshold value can be parameterized or is parameterized depending on the consumer that is to be protected. As described above, the previously stipulated threshold value can be used to stipulate the conditions under which the overcurrent protection device triggers or does not trigger, the conditions generally being dependent on temperature.

When the present description discusses a parameterization of different parameters or an ability of different parameters to be parameterized, this should be understood as meaning that the corresponding parameters for each consumer or each overcurrent protection device are stored in a memory of the computation unit that executes the method. This can occur once either upon delivery or initial start-up of the overcurrent protection device. As an alternative, provision can also be made for the parameterization to be changed during operation.

In particular, the trigger characteristic curve represents a modeling of the heating of the consumer that is to be protected.

According to a second embodiment, a DC grid is proposed, which comprises a supply rail, which can be connected or is connected to a supply potential of the DC grid, and a load assembly comprising at least one consumer. Each of the consumers is coupled to the supply rail via an associated controllable overcurrent protection device. A current-dependent trigger characteristic curve is associated with each of the consumers. In an embodiment, the overcurrent protection device is designed according to an embodiment described herein.

A DC grid of this kind has the same advantages as have been described above in connection with an overcurrent protection device according to an embodiment of the invention.

According to an expedient configuration of the DC grid of an embodiment, the supply rail can be connected or is connected to a supply potential of the DC grid via an overcurrent protection device of the kind described herein, wherein the overcurrent protection device is designed to process a current-dependent trigger characteristic curve associated with the load assembly. According to this configuration, the overcurrent protection device is associated not with a single consumer but with an entire load assembly that has a multiplicity of consumers. The overcurrent protection device described here is thus located in a superordinate line branch, which supplies a number of consumers of the load assembly with current.

Another expedient configuration of an embodiment makes provision, in the case of a plurality of consumers, for a respective current-dependent trigger characteristic curve to be associated with each consumer, the trigger characteristic curves being able to be the same or different in pairs. As an alternative or in addition, in the case of a plurality of consumers, a respective previously stipulated threshold value can be associated with each consumer, the threshold values being able to be the same or different in pairs. In other words, identical or different current-dependent trigger characteristic curves can be associated with the consumers. Likewise, identical or different respectively previously stipulated threshold values for carrying out the method described above can be associated with the consumers. This is significant, in particular, when consumers with greatly different rated powers are provided in the DC grid. In this case, the operating state of a consumer with a high rated power can have repercussions on the line branch of the consumer with a low rated power, for example during generator operation. These different operating situations can be taken into consideration by the parameterization in the described manner, such that it is possible to avoid disconnecting or tripping the overcurrent protection device unnecessarily and/or too early.

According to a third embodiment of the present invention, a method for operating an overcurrent protection device for protecting a consumer arranged in a DC grid is proposed. In the DC grid, the consumer is coupled via the overcurrent protection device to a supply rail, which can be connected or is connected to a supply potential of the DC grid. In the method, a present trigger value is ascertained based upon a detection value of a current flowing through the overcurrent protection device and based upon a current-dependent trigger characteristic curve associated with the consumer, wherein the current is taken into consideration together with a first or a second factor in the trigger characteristic curve, depending on the current direction. Furthermore, in the method, the present trigger value is compared with a previously stipulated threshold value. Finally, the overcurrent protection device is triggered or not triggered depending on the result of the comparison.

The method has the same advantages as have been described above in connection with the overcurrent protection device according to an embodiment of the invention.

According to a fourth embodiment, the invention proposes a computer program product, which can be loaded directly into the internal memory of a digital control unit of an overcurrent protection device and comprises software code sections, using which the steps of the method described herein are executed when the product is run on the control unit. The computer program product can be embodied in the form of a storage medium, such as a USB memory stick, a DVD, a CD-ROM or a memory card, for example. The computer program product can also be present in the form of a signal that can be loaded via a wireless or wired communication link.

According to a fifth embodiment of the present invention, a method for operating a DC grid is proposed, which comprises a supply rail, which can be connected or is connected to a supply potential of the DC grid, and a load assembly comprising at least one consumer, wherein each of the consumers is coupled to the supply rail via an associated controllable overcurrent protection device and wherein a current-dependent trigger characteristic curve is associated with each of the consumers. In the method, for each of the at least one consumer, the following steps are carried out independently of one another: a present trigger value is ascertained based upon a detection value of a current flowing through the overcurrent protection device associated with the consumer and based upon a current-dependent trigger characteristic curve associated with the respective consumer, wherein the current is taken into consideration together with a first or a second factor in the trigger characteristic curve, depending on the current direction. The present trigger value is compared with a threshold value previously stipulated for the respective consumer. The overcurrent protection device associated with a respective consumer is triggered or not triggered depending on the result of the comparison.

The method has the same advantages as have been described above.

In an expedient configuration, the method is carried out by a central control unit of the DC grid or by respective computation units of the overcurrent protection devices. A distribution of the tasks is also conceivable.

According to a sixth embodiment, the invention proposes a computer program product, which can be loaded directly into the internal memory of a digital control unit and comprises software code sections, using which the previously described steps are executed when the product is run on the control unit. The computer program product can be embodied in the form of a storage medium, such as a USB memory stick, a DVD, a CD-ROM or a memory card, for example. The computer program product can also be present in the form of a signal that can be loaded via a wireless or wired communication link.

FIG. 1 shows a schematic illustration of an overcurrent protection device 11S for protecting a consumer arranged in a DC grid. The DC grid 1 provides a DC voltage at a supply rail 10V. In the schematic illustration, the DC voltage is provided by way of example by a battery 5. It is understood that the battery 5 is purely representative of an arbitrary energy source or a combination of a plurality of energy sources, at terminals of which a DC voltage is provided. Energy sources may be, for example, a photovoltaics installation and/or a battery store, but also a rectifier, which generates the DC voltage by rectifying an AC voltage generated by an AC voltage source.

In the present example embodiment, the consumer is represented by an inverter 11, to which a three-phase motor 12 is connected. The inverter 11 in a known manner converts the DC voltage provided by the DC grid to a three-phase or AC voltage that is required by the motor 12. For this purpose, the inverter 11 has a number of controllable switching elements (not illustrated) and at least one capacitor (not illustrated) and therefore constitutes a capacitive consumer.

It is understood that the consumer shown here is purely example and other consumers, such as resistors and/or inductive loads, for example, could also be used instead.

The overcurrent protection device 11S comprises a controllable switching element 15 and a current measurement device 16 interconnected in series therewith. The controllable switching element 15 can be turned on or off by a control unit (either the overcurrent protection device 11S itself or a superordinate control unit), which is not illustrated here. If the controllable switching element is turned on, the consumer 11, 12 (that is to say the associated unit composed of the inverter 11 and the motor 12 connected thereto) is connected to the supply rail 10V, such that a current I11 flows via the controllable switching element 15 and the current measurement device 16 into the consumer 11, 12. In the event of an overcurrent, the controllable switching element 15 is turned off by the control unit so that the flow of current into the consumer 11, 12 is stopped.

The controllable switching element 15 is a power electronics component, for example a MOSFET (metal-oxide-silicon field-effect transistor), IGBT (insulated-gate bipolar transistor), and so on. The power electronics component may be of n-channel or p-channel type or npn or pnp type. The semiconductor material may be based on silicon (Si) or gallium nitride (GaN) or similar. The controllable switching element can comprise one or more power electronics components of the mentioned kind, in particular connected in anti-series or in parallel.

Figure 3:
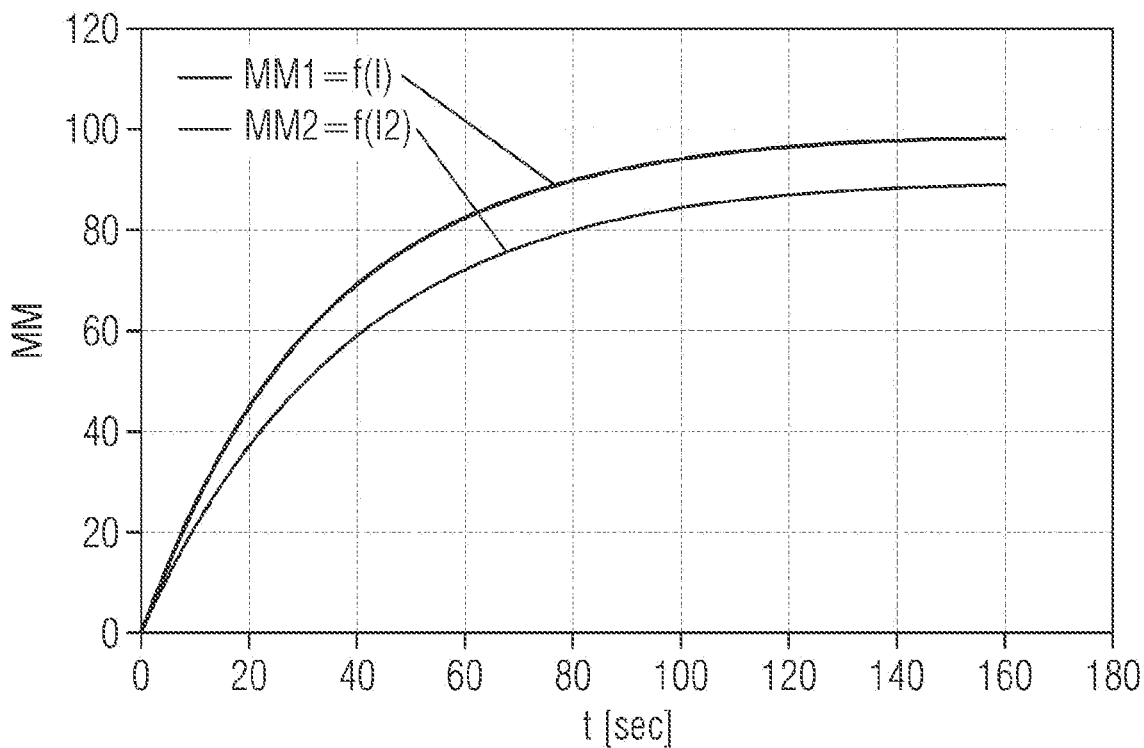
FIG. 3 shows a graph in which example current-dependent trigger characteristic curves for determining a trigger criterion are represented.

A current-dependent trigger characteristic curve is associated with the consumer 11, 12. The current-dependent trigger characteristic curve represents a modeling of the heating of the consumer that is to be protected. Current-dependent trigger characteristic curves are shown by way of example in FIG. 3, wherein the graph shows the present trigger values MM of two different current-dependent trigger characteristic curves MM1, MM2 as a function of time. The upper characteristic curve denoted by MM1 represents a current-dependent characteristic curve that has a linear dependency on the current that flows through the consumer. The lower characteristic curve denoted by MM2 represents a characteristic curve that has a quadratic dependency on the current flowing through the consumer. The characteristic curves are selected purely by way of example and serve for the purpose of illustration. The actual profile of the characteristic curves that represents a heating as a function of time and the current flowing through the consumer may also appear differently in practice.

Figure 4:
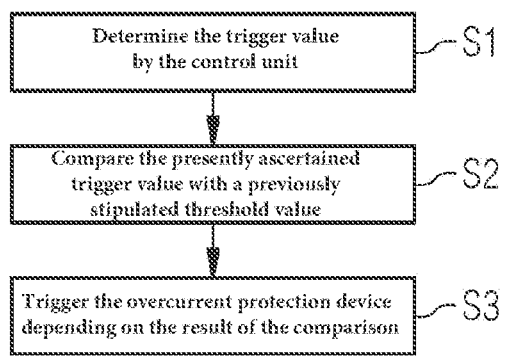
FIG. 4 shows a flowchart illustrating the steps of the method according to an embodiment of the invention.

The overcurrent protection device 11S illustrated in FIG. 1 is designed to ascertain a present trigger value based upon a detection value of the current I11 flowing through the overcurrent protection device 11S and thus the consumer 11, 12 and based upon the current-dependent trigger characteristic curve (MM1 or MM2) associated with the consumer 11, 12. The present trigger value is determined computationally by the control unit, which has already been mentioned but is not illustrated, based on the actual current and, for example, the computation rule of the current-dependent trigger characteristic curve that is stored in a memory (step S1 of the flowchart in FIG. 4). In a next step (step S2 of the flowchart in FIG. 4), the presently ascertained trigger value is compared with a previously stipulated threshold value. The previously stipulated threshold value is referred to as a trigger discriminant and is stored in a memory of the control unit. The threshold value can be prescribed for the consumer under consideration in advance by tests or by the manufacturer. The overcurrent protection device is then triggered depending on the result of the comparison, wherein triggering is understood to mean turning off the controllable switching element 15 (step S3 in FIG. 4).

The current Ill, which is presently ascertained as the actual current by the current measurement device, is taken into consideration together with a first or a second factor, different from the first, in the trigger characteristic curve, depending on the current direction. Taking the current direction into consideration permits cooling effects, for example. As a result, there is no static triggering of the overcurrent protection device, as is the case, for example, in conventional safety fuses, but instead there is an adapted overcurrent triggering depending on the operating situation.

The advantage of the described procedure resides in a multiplicity of parameters being able to be adapted initially upon start-up of the overcurrent protection device and/or the consumer in the DC grid 1 and/or also at runtime. For example, the first and/or the second factor may be able to be parameterized or may be parameterized depending on the consumer that is to be protected. As an alternative or in addition, the first or the second factor may be able to be parameterized or may be parameterized depending on the profile of the trigger characteristic curve (MM1 or MM2). As an alternative or in addition, the previously stipulated threshold value may be able to be parameterized or may be parameterized depending on the consumer that is to be protected. This enables the overcurrent protection device to be matched precisely to the consumer 11, 12 associated therewith. Through the different evaluation of the current direction, it is not only possible to save on device variance, but it is also possible to realize a selectivity desired by the customer. This means that only the protection apparatus situated closest to the fault is triggered and disconnects the fault.

In order to be able to perform the weighting of the current in a manner dependent on the current direction when ascertaining the present trigger value, the current measurement device 16 has to be set up to detect the sign, that is to say the direction, of the current flowing through the device. This can be brought about, for example, by way of a current measurement device that comprises a sensor based on the Hall principle. A highly integrated Hall sensor of this type is described in EP 2 619 595 B1, the entire contents of which are hereby incorporated herein by reference, for example.

The controllable switching element 15 and the current measurement device 16 are preferably designed as a modular unit, as is illustrated in the drawings. However, this is not compulsory.

Figure 2:
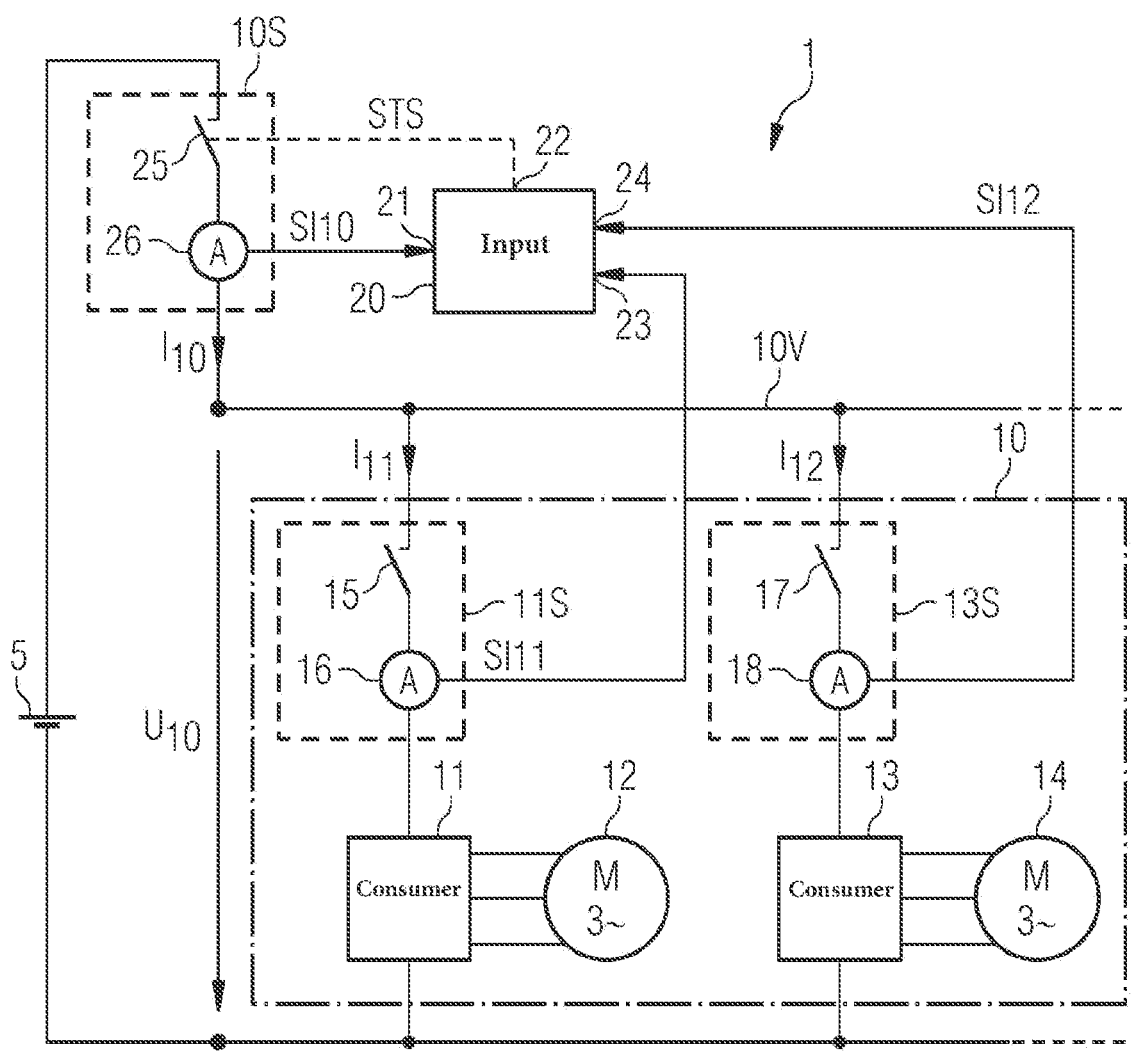
FIG. 2 shows a schematic illustration of an example DC grid with a plurality of consumers that are protected by respective overcurrent protection devices.

FIG. 2 shows a schematic illustration of an example DC grid 1, to which a load assembly having by way of example two different consumers 11, 12 and 13, 14, respectively is connected. The full ensemble composed of consumers 11, 12 and 13, 14, respectively, and the overcurrent protection devices 11S and 13S, respectively, associated with the consumers is referred to in the present case as load assembly 10. As can readily be seen in the diagrammatic illustration, the consumers 13, 14 are an inverter 13 and a motor 14 supplied thereby. The motors 12, 14 may be motors with greatly different rated powers, for example.

Each of the consumers 11, 12 and 13, 14, respectively, is connected to the busbar 10V via the respectively associated overcurrent protection device 11S, 13S. A further overcurrent protection device 10S is also provided, which connects the busbar 10V to the battery 5. The construction of all of the overcurrent protection devices 10S, 11S and 13S corresponds to the construction as has been described in connection with FIG. 1. Another explanation is therefore omitted.

In contrast to the preceding example embodiment, the detection values SI11, SI12 and SI10 provided by the respective current measurement devices 16, 18, 26 of the respective overcurrent protection devices 11S, 13S, 10S are transmitted to a central computation unit 20 of the DC grid for the purpose of processing. In this example embodiment, the control unit 20 evaluates all of the detection values and carries out the method described in connection with FIG. 1 for each consumer 11, 12 and 13, 14, respectively, and for the load assembly 10 as a whole, wherein, for each of the consumers 11, 12 and 13, 14, respectively, and the load assembly 10, the respectively associated (identical or different) current-dependent trigger characteristic curve and respective previously stipulated (identical or different) threshold values and (identical or different) first and second factors are processed.

In the event of an overcurrent being determined in one of the branches, the relevant controllable switching element 15 and 16, respectively, or 25 can then be turned off by the control unit 20. For reasons of clarity, only one control signal STS for driving the controllable switching element 25 of the overcurrent protection device 10S is illustrated.

The respective detection values SI11, SI12 and SI10 are provided at inputs 21, 23, 24 of the control unit 20. The control signal STS for the controllable switching element 25 of the overcurrent protection device 10S is provided to an output 22 of the control unit 20. It is understood that corresponding outputs at which corresponding control signals are provided are also provided at the control unit 20 for the respective controllable switching elements 15, 17 of the overcurrent protection devices 11S, 13S.

Central processing as illustrated in FIG. 2 for carrying out the method according to the invention is purely example. The method described in connection with FIG. 1 could likewise also be carried out in a respective computation unit of each overcurrent protection device 11S, 13S, 10S. A combination of different task distributions is also conceivable.

The provision of a central control unit facilitates the parameterization of a multiplicity of different overcurrent protection devices and consumers.

The invention claimed is:

1. An overcurrent protection device for protecting a consumer arranged in a DC grid, wherein the consumer is coupled via the overcurrent protection device to a supply rail, which is configured to connect to a supply potential of the DC grid, the overcurrent protection device comprising:
   a measurement device configured to determine a detection value of a current flowing through the overcurrent protection device; and
   a controller configured to
      determining a trigger value based on the detection value and a single current-dependent trigger characteristic curve associated with the consumer,
      compare the trigger value with a threshold value, and
      trigger the overcurrent protection device upon the trigger value exceeding the threshold value, wherein the overcurrent protection device is not triggered when the trigger value does not exceed the threshold value,
   wherein, upon the trigger value being determined based on the single current-dependent trigger characteristic curve, the detection value of the current flowing through the overcurrent protection device is taken into consideration together with a first factor or a second factor; and
   wherein the first factor and the second factor are based on a direction of the flow of the current.

2. The overcurrent protection device of claim 1, wherein the overcurrent protection device comprises a controllable switching element and the measurement device is a current measurement device, the controllable switching element and the current measurement device being connected in series, and
    wherein the current measurement device is configured to detect a level of the current flowing through the controllable switching element during a switch-on phase of the controllable switching element, and the current measurement device is configured to provide the level as the detection value.

3. The overcurrent protection device of claim 2, wherein the current measurement device includes a sensor based on the Hall principle.

4. The overcurrent protection device of claim 2, wherein at least one of the first factor or the second factor is parameterizable depending on the consumer to be protected.

5. The overcurrent protection device of claim 2, wherein at least one of the first factor or the second factor is parameterizable, depending on a profile of the single current-dependent trigger characteristic curve.

6. The overcurrent protection device of claim 2, wherein the threshold value is parameterizable depending on the consumer to be protected.

7. The overcurrent protection device of claim 2, wherein the single current-dependent trigger characteristic curve represents a modeling of a heating of the consumer to be protected.

8. The overcurrent protection device of claim 1, wherein at least one of the first factor or the second factor is parameterizable depending on the consumer to be protected.

9. The overcurrent protection device of claim 1, wherein at least one of the first factor or the second factor is parameterizable depending on a profile of the single current-dependent trigger characteristic curve.

10. The overcurrent protection device of claim 1, wherein the threshold value is parameterizable depending on the consumer to be protected.

11. The overcurrent protection device of claim 1, wherein the single current-dependent trigger characteristic curve represents a modeling of a heating of the consumer to be protected.

12. A DC grid, comprising:
    a supply rail configured to connect to a supply potential of the DC grid; and
    a load assembly including at least one consumer, wherein each respective consumer of the at least one consumer is coupled to the supply rail via an associated overcurrent protection device, wherein a single current-dependent trigger characteristic curve is associated with each respective consumer of the at least one consumer, and wherein each associated overcurrent protection device includes
    a measurement device configured to determine a detection value of a current flowing through the associated overcurrent protection device, and
    a controller configured to
        determine a trigger value based on the detection value and tghe single current-dependent trigger characteristic curve associated with the respective consumer,
        compare the trigger value with a threshold value, and
        trigger the associated overcurrent protection device in response to the trigger value exceeding the threshold value, wherein the associated overcurrent protection device is not triggered when the trigger value does not exceed the threshold value, wherein, in response to the trigger value being determined based on the single current-dependent trigger characteristic curve, the detection value of the current flowing through the associated overcurrent protection device is taken into consideration together with a first factor or a second factor, and
        wherein the first factor and the second factor are based on a direction of the flow of the current.

13. The DC grid of claim 12, wherein the supply rail is configured to connect to the supply potential of the DC grid via the associated overcurrent protection device, wherein the associated overcurrent protection device is designed to process a single current-dependent trigger characteristic curve associated with the load assembly.

14. The DC grid of claim 12, wherein for each respective consumer of a plurality of consumers, a single respective current-dependent trigger characteristic curve is associated with each respective consumer, the single respective current-dependent trigger characteristic curves being the same or different in pairs.

15. The DC grid of claim 12, wherein for each respective consumer of a plurality of consumers, a respective threshold value is associated with each respective consumer, the respective threshold values being the same or different in pairs.

16. A method for operating an overcurrent protection device configured to protect a consumer arranged in a DC grid, the consumer being coupled via the overcurrent protection device to a supply rail, which is configured to connect to a supply potential of the DC grid, the method comprising:
    determining a trigger value based on a detection value of a current flowing through the overcurrent protection device and a single current-dependent trigger characteristic curve associated with the consumer, wherein, upon the trigger value being determined based on the single current-dependent trigger characteristic curve, the detection value of the current flowing through the overcurrent protection device is taken into consideration together with a first factor or a second factor, and the first factor the second factor are based on a direction of the flow of the current;
    comparing the trigger value with a threshold value; and
    triggering the overcurrent protection device upon the trigger value exceeding the threshold value, wherein the overcurrent protection device is not triggered when the trigger value does not exceed the threshold value.

17. A non-transitory computer program product, loadable into an internal memory of a digital controller of an overcurrent protection device and storing a program including software code sections to execute the method of claim 16 when the program is run on the digital controller.

18. A method for operating a DC grid, the DC grid including a supply rail, configured to connect to a supply potential of the DC grid, and a load assembly including at least one consumer, wherein each respective consumer of the at least one consumer is coupled to the supply rail via an associated overcurrent protection device, wherein a single current-dependent trigger characteristic curve is associated with each respective consumer of the at least one consumer, and wherein, for each respective consumer of the at least one consumer, independently of one another, the method comprises: determining a trigger value based on a detection value of a current flowing through the overcurrent protection device associated with the respective consumer and the single current-dependent trigger characteristic curve associated with the respective consumer, wherein upon the trigger value being determined based on the single current-dependent trigger characteristic curve, athe detection value of the current flowing through the overcurrent protection device is taken into consideration together with a first factor or a second factor, and the first factor and the second factor are based on direction of the flow of the current; comparing the trigger value with a respective threshold value for the respective consumer; and triggering the overcurrent protection device associated with the respective consumer upon the trigger value exceeding the respective threshold value, wherein the overcurrent protection device is not triggered when the trigger value does not exceed the threshold value.

19. The method of claim 18, wherein the method is carried out by a central control unit or by respective computation units of the overcurrent protection devices.

20. A non-transitory computer program product, loadable into an internal memory of a digital controller and storing a computer program including software code sections to execute the method of claim 18 when the computer program is run on the digital controller.

\* \* \* \* \*